United States Patent [19]
Preston

[11] Patent Number: 5,924,236
[45] Date of Patent: Jul. 20, 1999

[54] FISHING LURE WITH MAGNETICALLY ACTUATED PARTS

[76] Inventor: Roy Preston, 20 Mountain View Pl., San Mateo, Calif. 94402

[21] Appl. No.: 09/036,264

[22] Filed: Mar. 6, 1998

Related U.S. Application Data

[63] Continuation-in-part of application No. 08/958,173, Oct. 27, 1997.

[51] Int. Cl.⁶ .................................................. A01K 85/00
[52] U.S. Cl. ...................... 43/42.31; 43/42.03; 43/42.04; 43/42.36
[58] Field of Search ................................ 43/42.03, 42.04, 43/42.31, 42.36

[56] References Cited

U.S. PATENT DOCUMENTS

| | | | |
|---|---|---|---|
| 2,965,996 | 12/1960 | Hughes | 43/42.22 |
| 3,279,117 | 10/1966 | Weimer | 43/42.03 |
| 3,340,643 | 9/1967 | Weimer | 43/42.12 |
| 3,800,461 | 4/1974 | Jacobi | 43/44.88 |
| 3,874,110 | 4/1975 | Larson | 43/43.12 |
| 4,175,348 | 11/1979 | Ray | 43/17.6 |
| 4,509,287 | 4/1985 | Hood | 43/19.2 |
| 4,761,910 | 8/1988 | Ninomiya | 43/42.31 |
| 4,878,310 | 11/1989 | Hannon et al. | 43/42.04 |
| 4,922,645 | 5/1990 | Hannon et al. | 43/42.4 |
| 5,428,916 | 7/1995 | Dubriske | 43/19.2 |
| 5,595,013 | 1/1997 | Dubriske | 43/19.2 |
| 5,640,798 | 6/1997 | Garst | 43/42.55 |
| 5,694,714 | 12/1997 | Basso et al. | 43/26.2 |

OTHER PUBLICATIONS

"Magnetism and Life", Charles P. Bean, Fundamentals of Physics, Halliday and Resnick, pp. E14–1 to E14–5, Jan. 1988.

*Primary Examiner*—Michael J. Carone
*Assistant Examiner*—Fredrick T. French, III

[57] ABSTRACT

A fish lure containing one or more magnets that are arranged to respond to motion through surrounding water to generate an undulating magnetic field wherein the field itself attracts fish and/or the magnets is an array where interaction between the magnets causes parts of the lure to wriggle or flap in a manner resembling a small fish or insect.

4 Claims, 1 Drawing Sheet

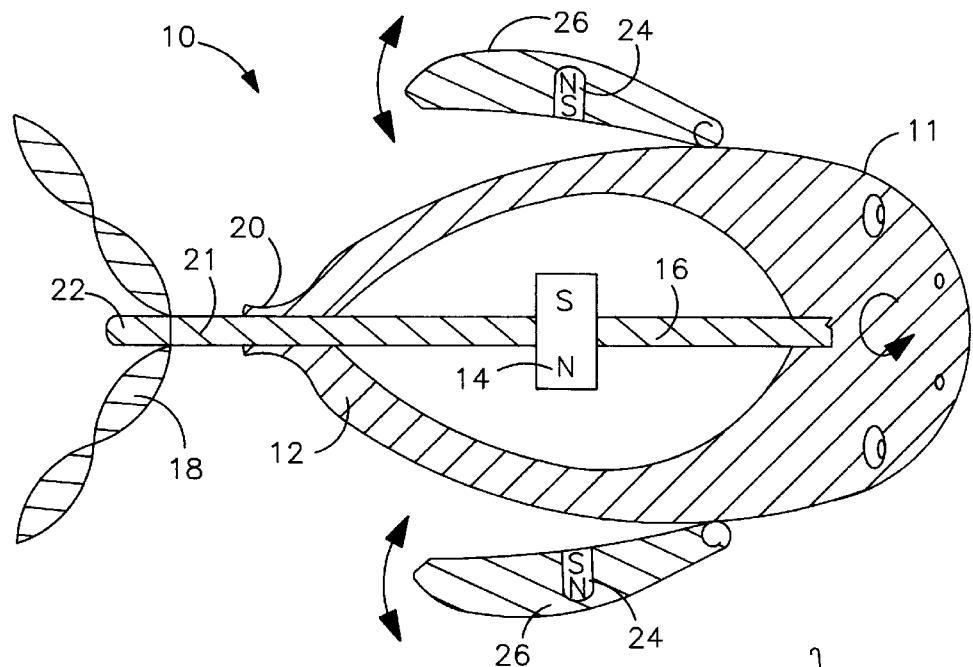
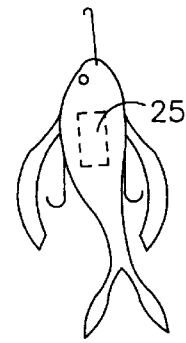
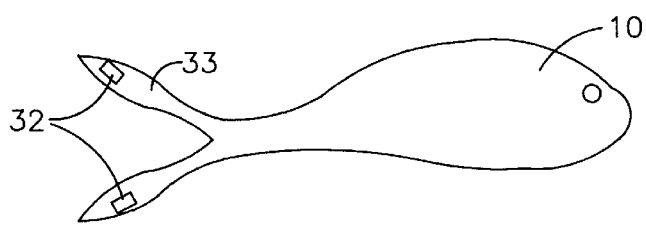
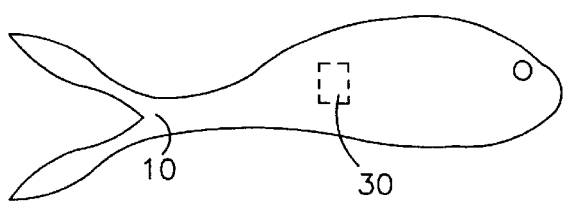
FIG. 1
FIG. 2
FIG. 3
FIG. 4
FIG. 5

FISHING LURE WITH MAGNETICALLY ACTUATED PARTS

CROSS REFERENCE TO EARLIER APPLICATIONS

This application is a continuation-in part of application Ser. No. 08/958,173 filed Oct. 27, 1997, pending for which priority is claimed.

FIELD OF THE INVENTION

This invention relates to fishing lures and especially to a fishing lure with a magnetic structure that actuates parts of the lure such as simulated fins and tail to flutter when the lure is pulled through the water.

BACKGROUND OF THE INVENTION

Fish lures are attached to the end of a fishing line and attract a fish to bite on a hook concealed or disguised by the lure. Fish lores are designed to resemble anyone of a large number of items depending on the type of fish to be caught. Some lures resemble insects. floating on the top of the water and are used in "fly" fishing. Other lures resemble small fish and are used in deeper water fishing. Characteristics of a fish lure that are most effective in attracting the fish include the shape of the lure to resemble an insect or a small fish and bright colors that help distinguish the lure from its surroundings. Another characteristic that is helpful in improving the attraction to fish is motion of features of the lure such as, for example, fluttering of the fins or tail of a lure resembling a small fish or the wings of a lure resembling an insect. Such approaches to constructing a lure have been disclosed.

For example, U.S. Pat. No. 5,694,714 to Basso discloses a lure resembling an insect having a torso or body section housing a battery driven motor that is coupled to wings that flap as the motor rotates. Several hooks are attached to the lure for snaring the fish. A limitation of this principle of operation is the miniaturization required to house all of the component parts of the lure and the requirement to maintain an adequate battery supply.

U.S. Pat. No. 5,640,798 to Garst discloses a method for making a fish lure including the steps of die casting a plastic elongated body having fins with curved sections that undulate as the lure is drawn through the water. A limitation of this principle of operation is that the design of lure is limited to a shape that is most effective in causing undulation of the fins as the lure is towed through the water.

Other features of fish lures have been disclosed. For example, U.S. Pat. No. 5,333,405 to Bowles discloses a soft plastic housing that contains slowly dissolving microcapsules of liquid fish attractant. The microspheres of attractant must be replenished periodically.

Magnetic fields have been found to have a little understood attractive influence on fish but this phenomenon has never been associated in use with fish lures.

SUMMARY OF THE INVENTION

It is an object of this invention to provide a fish lure in which the lure resembles a small fish or insect in which the parts of the lure undulate so as to resemble a small fish or insect as the lure is drawn through the water.

It is another object that principles of operation of the moving parts of the lure not place a limitation on the general external shape of the lure such as disclosed in the patent to Garst.

It is another object that the cost of building and complexity of operation of the lure be minimal compared to lures such as disclosed by Basso. It is another object that the lure emanate a time varying magnetic field that aids in the attraction of fish to the lure.

This invention is directed toward a fishing lure which, in one embodiment, resembles a small fish with flapping fins and wiggling tail as the lure is pulled through the water. The lure of this embodiment has a propeller-like tail mounted on a rotatable shaft extending through the body of the lure. A small "body" magnet is mounted on the shaft inside the body of the lure so that the "body" magnet rotates with the shaft. Another pair of "fin" magnets is mounted, each "fin" magnet on a flappable fin on one side of the lure, adjacent the "body" magnet and opposite the "fin" magnet on the opposite side of the lure. As the "body" magnet rotates, each fin magnet is alternately attracted and repulsed by the rotating "body" magnet causing the fins to flap.

In another embodiment, the tail of the lure consists of a pair of flapping tail sections side by side. Each tail section contains a magnet arranged to repulse the magnet in the neighboring tail section and the tail sections are elastically biased so that, any motion of the lure causes the tail section to oscillate.

The magnets in the lure, either as part of the dynamic examples given above or simply placed at appropriate locations in the body of the lure create an undulating magnetic field that attracts fish to bite on the lure.

BRIEF DESCRIPTION OF THE FIGURES

FIG. 1 shows an embodiment of the invention having a rotating tail.

FIG. 2 shows an embodiment of the invention with magnets in the tail.

FIG. 3 shows an embodiment of the invention with magnets in the body of the lure.

FIG. 4 shows a disguised magnet functioning as a lure.

FIG. 5 is a flow chart of the method of the invention.

DESCRIPTION OF ILLUSTRATIVE EXAMPLES

Turning now to a discussion of the drawings, FIG. 1 is a sectional view showing one embodiment of the lure of this invention 10 resembling a small fish including a body section 12 that houses a "body" magnet 14 mounted on a rotatable shaft 16 extending from the "head" of the fish lure 10 and exiting through the "tail" end 20 of the lure 10. A propeller-like tail 18 is mounted on the protruding end 22 of the shaft 16. When the lure 10 is pulled through the water, the propeller-like tail 18 rotates thereby causing the "body" magnet 14 to rotate. The rotating body magnet 14 alternately attracts and repels "fin" magnets 24 located in fins 26 hingably attached or imbedded to the body section causing the fins 26 to flutter.

In another embodiment of the invention, magnets in the lure generate an attractive undulating magnetic field due to undulation of the fish lure 10 dragged in the water.

FIG. 2 shows a pair of magnets 32 located in the tail 33 of the lure 10.

FIG. 3 shows at least one magnet 30 is located in the body 28 of the lure.

FIG. 4 shows a disguised magnet 25 large enough to function as a weight for the line. A construction of fish lures has been described in which one or more magnets are contained in a body section of the lure and used to generate lifelike motions in extremities of the lure along with an undulating magnetic field that enhance the attraction of the lure for game fish. Variations of this invention may be suggested by reading the specification and studying the drawings that are within the scope of the invention. For example, the lure may be disguised as a small fish or insect. One or more magnets may be located in one or more fortuitous locations to produce the desired movement and/or field. The lure may have more than one hook for snaring the fish. The body section holding the magnets may be in a tail section, body section, head section or extremities of the lure. The magnet may be concealed in dead bait.

FIG. 5 is a flow chart of the method of practicing this invention. In view of these variations, In step 1, a lure is provided containing a concealed magnet.

In step 2 the lure is attached to the end of a fishing line.

In step 3 the lure with concealed magnet is cast into a body of water and the fisherman waits for a fish to be attracted to the lure by the combination of lure, magnet, and (in some instances) bait on one or more hooks attached to the lure.

In step 4, the fisherman hauls in a fish snare by the hook.

In view of these and other variations, I therefore wish to define the scope of my invention by the claims.

I claim:

1. A fish lure comprising, a body section having a head end and a tail end, said body section being formed of a non magnetic material; and at least one hook means arranged together with said body section for catching fish; and at least one magnet member being assembled together with said body section to generate a magnetic field; and a pair of fin members, one of said pair of fin members having an end hingably attached on one side of said body section opposite another one of said pair of fin members having an end hingable attached on another side of said body section; and a rotatable shaft extending from said head end through said tail end and extending externally from said tail end; and a propeller means mounted on said rotatable shaft for rotating said rotatable shaft when said lure is towed through water in a direction from said tail end to said head end; and said at least one magnet member including a body magnet mounted on said rotatable shaft and a pair of fin magnets, one of said pair of fin magnets mounted in one of said pair of fin members and another one of said pair of fin magnets mounted in another of said pair of fin members, said body magnet and pair of fin magnets arranged in operable communication with one another to provide that, when said body magnet rotates, each of said pair of fin magnets will be alternately repulsed by and attracted to said body magnet causing said pair of fin members to flap as said fish lure is pulled through water.

2. The fish lure of claim 1 wherein said hook means and said magnet member comprise a magnetized hook.

3. The fish lure of claim 1 wherein said magnet member is sufficiently large to weight a line to which said fish lure is attached.

4. The fish lure of claim 1 wherein said body section resembles one of:

(i) a fish;

(ii) an insect;

and has a tail end and a head end.

* * * * *